US011258868B2

(12) United States Patent
Tong et al.

(10) Patent No.: US 11,258,868 B2
(45) Date of Patent: Feb. 22, 2022

(54) IDENTIFYING INTERACTIONS PERFORMED BY USERS OF AN ONLINE SYSTEM WITH THIRD PARTY CONTENT BASED ON INFORMATION RECEIVED BY THE ONLINE SYSTEM FROM A TRACKING MECHANISM

(71) Applicant: META PLATFORMS, INC., Menlo Park, CA (US)

(72) Inventors: Wai Man Tong, Fremont, CA (US); Mayank Kumar, Mountain View, CA (US); Gabriel Allan Francis, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 1008 days.

(21) Appl. No.: 14/846,720

(22) Filed: Sep. 4, 2015

(65) Prior Publication Data

US 2017/0070584 A1    Mar. 9, 2017

(51) Int. Cl.
*H04L 29/08*    (2006.01)
*H04L 29/06*    (2006.01)
*H04L 67/53*    (2022.01)
*H04L 67/01*    (2022.01)
*H04L 67/306*   (2022.01)

(52) U.S. Cl.
CPC ............ *H04L 67/20* (2013.01); *H04L 67/306* (2013.01); *H04L 67/42* (2013.01)

(58) Field of Classification Search
CPC ........ H04L 67/20; H04L 67/306; H04L 67/42

USPC ........................................................ 709/203
See application file for complete search history.

(56) References Cited

U.S. PATENT DOCUMENTS

| | | | | |
|---|---|---|---|---|
| 5,935,207 | A * | 8/1999 | Logue ................... | H04L 67/288 709/219 |
| 8,990,105 | B1 * | 3/2015 | Shatkin-Margolis ........................ | G06Q 30/02 705/14.25 |
| 9,530,160 | B2 * | 12/2016 | Lau ......................... | G06Q 50/01 |
| 9,912,767 | B1 * | 3/2018 | Weald ..................... | H04L 67/42 |
| 2009/0048902 | A1 * | 2/2009 | Lynn ................ | G06Q 10/06375 705/7.37 |
| 2009/0070219 | A1 * | 3/2009 | D'Angelo .............. | G06Q 10/10 705/14.56 |
| 2009/0119167 | A1 * | 5/2009 | Kendall .................. | G06Q 30/02 705/14.17 |
| 2010/0094703 | A1 * | 4/2010 | Bramley ................. | G06Q 30/02 705/14.45 |
| 2011/0231240 | A1 * | 9/2011 | Schoen .............. | G06Q 30/0242 705/14.41 |

(Continued)

*Primary Examiner* — Schquita D Goodwin

(57) ABSTRACT

A third party system includes a tracking mechanism in various content provided by the third party system. When a client device presents content provided by the third party system, the client device executes tracking mechanism, causing the client device to communicate information identifying the content, identifying a user associated with the online system, and other information to the online system. Based on the information received from the client device, the online system selects a rule from rules provided to the online system by the third party system. The online system then performs an action included in the selected rule, allowing the advertiser to initiate various actions by the online system while including a common tracking mechanism in different content provided by the third party system.

11 Claims, 2 Drawing Sheets

(56) References Cited

U.S. PATENT DOCUMENTS

| | | | |
|---|---|---|---|
| 2011/0276396 A1* | 11/2011 | Rathod | H04L 51/066 705/14.49 |
| 2012/0072228 A1* | 3/2012 | Pankajakshan | G06Q 30/0241 705/1.1 |
| 2012/0166520 A1* | 6/2012 | Lindsay | G06Q 30/0241 709/203 |
| 2013/0073401 A1* | 3/2013 | Cook | G06Q 30/02 705/14.73 |
| 2014/0149213 A1* | 5/2014 | Fallatah | G06Q 30/0255 705/14.53 |
| 2014/0222561 A1* | 8/2014 | Mathur | G06Q 30/0255 705/14.53 |
| 2014/0229278 A1* | 8/2014 | Cohen | G06Q 30/0267 705/14.53 |
| 2015/0046579 A1* | 2/2015 | Perez | G06F 16/23 709/224 |
| 2015/0088662 A1* | 3/2015 | Noller | G06Q 30/02 705/14.66 |
| 2016/0253710 A1* | 9/2016 | Publicover | G06Q 30/02 705/14.66 |
| 2017/0038916 A1* | 2/2017 | Beach | G06F 16/9535 |

* cited by examiner

IDENTIFYING INTERACTIONS PERFORMED BY USERS OF AN ONLINE SYSTEM WITH THIRD PARTY CONTENT BASED ON INFORMATION RECEIVED BY THE ONLINE SYSTEM FROM A TRACKING MECHANISM

BACKGROUND

This disclosure relates generally to online systems, and more specifically to capturing information describing actions by online system users performed outside of the online system.

An online system, such as a social networking system, allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

The increasing popularity of online systems, such as social networking system, allows entities (e.g., businesses) to gain public attention for products or services or to persuade online system users to take actions regarding products or services provided by the entities via an online system. For example, an entity (e.g., a business) presents content items to online system users to gain public attention for products or services or to persuade online system users to take an action regarding products or services provided by the entity. Many online systems may receive compensation from an entity for presenting certain types of content items provided by the entity to online system users.

To more particularly tailor content presented by the online system to specific online system users, an entity may associate targeting criteria with content identifying characteristics of online system users eligible to be presented with the content. For example, if an entity associates content with targeting criteria identifying one or more characteristics of users eligible to be presented with the content, the online system identifies users of the online system having at least a threshold number of the one or more characteristics identified by the targeting criteria as eligible to be presented with the content and does not present the content to users who do not have at least the threshold number of the one or more criteria specified by the targeting criteria. User characteristics specified by targeting criteria may be demographic information, connections between users and other users, actions performed by the user, interests of the user, or any other suitable information maintained by the online system.

Additionally, entities may include tracking mechanisms in content provided by the entity or by a third party system associated with the entity that communicate information to the online system when the tracking mechanisms are executed by a client device presenting content including the tracking mechanisms. Conventional tracking mechanisms require entities to include different tracking mechanisms in content to provide different information to the online system. For example, a tracking mechanism included in content communicates information to the online system when a user presented with the content performs a specific interaction with the content, while a separate tracking mechanism communicates information describing additional content presented to the user. This use of multiple tracking mechanisms to provide different information to an online system requires an entity to maintain multiple tracking pixels and identify different content provided by the entity that includes different tracking mechanisms, increasing the complexity for the entity to communicate information describing interactions with content provided by the entity occurring outside of the online system to the online system

SUMMARY

An online system receives and stores various rules from a third party system identifying actions for the third party system to perform based on information describing content provided by the third party system that is presented to a user of the online system. The content provided by the third party system includes a tracking mechanism including instructions that are executed by a client device presenting the content that obtain information identifying the content and a user presented with the content and communicate information to the online system. For example, the third party system includes the tracking mechanism in various content provided by the third party system, such as various web pages provided by the third party system. When a client device presents content from the third party system, the client device executes the instructions included in the content that retrieves information identifying the content and also retrieves information identifying a user associated with the client device from information stored on the client device. In some embodiments, the instructions also identify additional content presented to the user by the client device, such as a web page presented to the user by the client device prior to presentation of a web page including the instructions being executed. Additionally, the instructions may also obtain information describing the client device, such as an operating system executing on the client device, a model or a type of the client device, a type of network connection by the device, or other suitable information. Execution of the instructions also causes the client device to communicate the information retrieved by the instructions to the online system. For example, executing instructions in the tracking mechanism creates a frame in the content provided by the third party system, where the frame is associated with the online system (e.g., the frame is in a domain of the online system) and communicates the information describing the interaction to the online system.

When the online system retrieves information from a client device that executed instructions included in content from the third party system presented to the user by the client device, the online system selects a rule from the rules received by the online system from the third party system. In various embodiments, the online system selects a rule including information identifying content that was identified by information received from the client device and includes additional information matching information received from the client device. For example, the online system selects a rule from the third party system including information identifying content that was identified by information received from the client device and also including information identifying additional content that was identified by the information received from the client device. The online system then performs an action identified by the selected rule. For example, various rules include a user identified by information received from the client device in one or more groups based on the information received from the client device. For example, the online system stores an association between information identifying a group identified by the selected rule and information used by the online system to identify the user corresponding to the information identifying the user in the information received from the client device.

Other rules associate a conversion event with the user identified by the information received from the client device. A conversion event is an action identified by the third party system for association with online system users. Example conversion events include: adding a product to an online shopping cart maintained by the third party system, viewing content (e.g., a web page, a product, etc.) provided by the third party system, viewing content provided by the third party system for at least a specified amount of time (e.g., viewing video data provided by the third party system for at least the specified amount of time), adding a product to a list of products associated with the user by the third party system, requesting information from the third party system, subscribing to a service provided by the third party system, storing content to the third party system, storing content provided by the third party system to the client device, indicating a preference for content provided by the third party system, sharing content provided by the third party system with another user, and providing a comment associated with content provided by the third party system. The online system stores a conversion event identified by the selected rule in association with information used by the online system to identify the user received from the client device.

In some embodiments, the information communicated from the client device to the online system when the instructions are executed includes a time when the instructions were executed by the client device. The online system may use the time when the instructions were executed by the client device along with the information identifying content presented by the client device or additional content presented by the client device to select a rule. Similarly, information describing the client device included in the information received by the online system may be used to select a rule. For example, a rule associates a user with a set of users if information identifying the user is received from a client device along with information identifying a particular web page presented by the client device, identifying an additional web page presented by the client device before the particular web page, and identifying a specific operating system of the client device.

Additionally, one or more rules may identify information received from applications executing on the client device other than an application presenting the content from the third party system, so the online system selects a rule based on information from the client device identifying content from the third party system presented to the user by the client device, information identifying additional content from the third party system that was presented to the user by the client device, and information received by the online system from one or more additional applications executing on the client device identifying one or more interactions with the additional applications and content presented by the one or more additional applications. This allows a third party system to provide the online system with rules that more specifically identify sets of users or to more particularly identify conversion events for association with users.

Associating rules with various information received from a tracking mechanism allows a third party system to identify different actions for the online system to perform allows the third party system to include a common tracking mechanism in various content provided by the third party system and allows the third party system to identify a variety of interactions with the content to be identified by the online system. Rather than include different tracking mechanisms on different content, the online system includes a common tracking mechanism on various content provided by the third party system and the online system performs different actions based on the information received by the online system when a client device executes the tracking mechanism. Hence, the third party system may more efficiently provide information to an online system to maintain information describing interactions by online system users with content provided by the third party system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
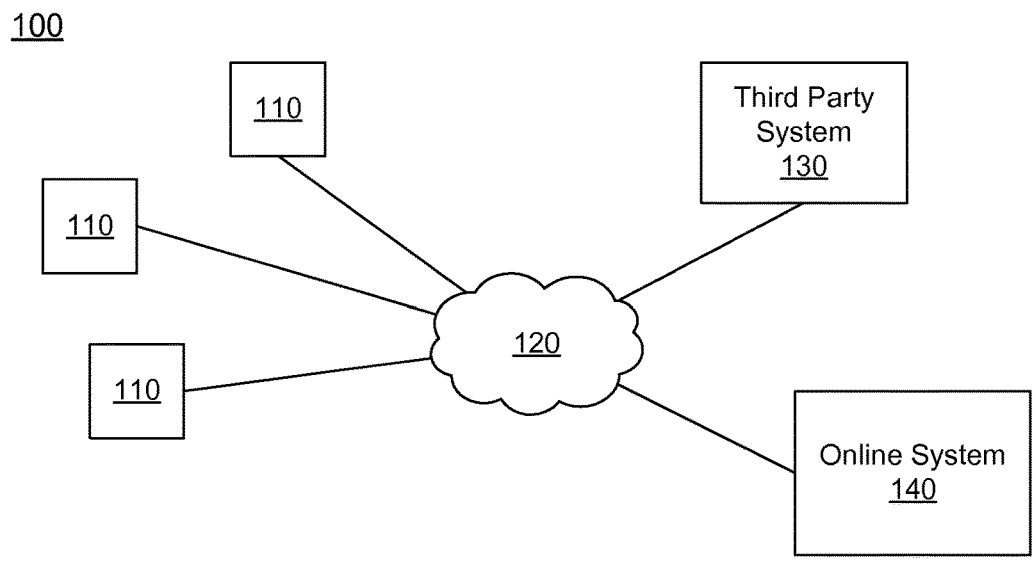
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In some embodiments, a third party system 130 includes a tracking mechanism (e.g., a tracking pixel) into content provided by the third party system 130, such as web pages. The third party system 130 may include a common tracking mechanism in various content provided by the third party system 130. For example, a third party system 130 provides various web pages each including a common tracking pixel. The tracking mechanism is instructions included in content provided by the third party system 130 that, when executed by a client device 110 presenting the content, communicates a request for content from the client device 110 to the online system 140 that includes information identifying the user to the online system 140 retrieved from the client device 110 and information describing the content from the third party system 130 that is presented. In some embodiments, execution of the tracking mechanism causes the client device 110 to communicate additional information to the online system 140, such as information identifying content from the third party system 130 presented to the user prior to presentation of the content including the tracking mechanism, information describing the client device 110 (e.g., such as an operating system executing on the client device 110, a model or a type of the client device 110, a type of network connection by the client device 110), a time when the client device 110 executed the tracking mechanism, a date and time when the content from the third party system 130 was presented by the client device 110, or other suitable information. A tracking mechanism included in content provided by a third party system 130 may communicate any suitable information to the online system 140 when executed by the client device 110.

Figure 2:
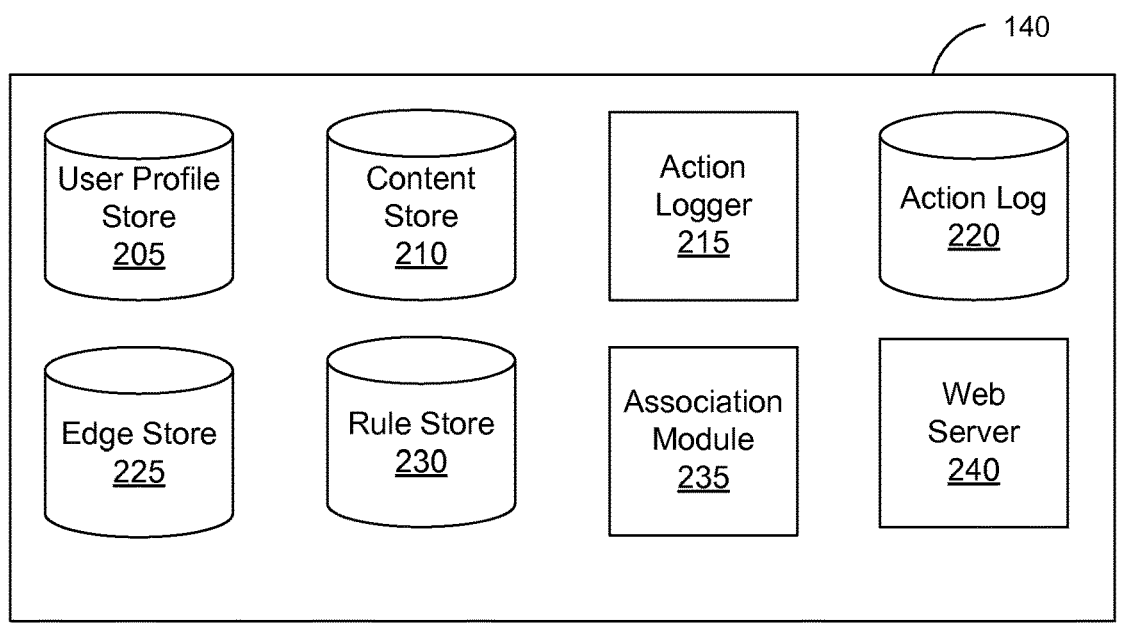
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, a rule store 230, an association module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. As an example, content provided by a third party system 130 to users of the online system may be identified along with information identifying an online system user 140 by information received by the online system 140, and the action logger 215 stores information identifying the content provided by the third party system 130 in the action log 220 in association with the identified user of the online system 140. For example, the action logger 215 logs information describing a number of times a user of the online system 140 accessed a web page provided by a third party system 130 as well as times when the user accessed the content based on information communicated to the online system 140 by a tracking pixel, or other tracking mechanism, included in the content, as further described below in conjunction with FIG. 3. As another example, the action logger 215 logs information describing interactions between a user of the online system 140 and an application (e.g., an application provided by the third party system 130) based on information communicated to the online system 140 by a tracking mechanism, such an application programming interface call, included in the application. For example, the tracking mechanism included in an application identifies a length of time with which the user interacted with the application or identifies one or more interactions with the application. Additionally, the action logger 215 logs information interactions between online system users and advertisements presented to the online system users. For example, information describing a number of times a user of the online system 140 clicked on an advertisement or completed a purchase through interacting with an advertisement is logged by the action logger 215 in association with information identifying the user; times associated with the interactions may also be stored in association with information identifying the user and identifying the advertisement. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items (including advertisements), and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Similarly, a third party system 130 may include a tracking mechanism in content provided by the third party system 130. When instructions included in the tracking mechanism are executed by a client device 110 presenting the content, the client device 110 communicates information identifying the content, information identifying a user of the online system 140 associated with the client device 110, and any other suitable information to the online system 140, which identifies one or more interactions with the content by the user based on the received information, as further described below. The online system 140 stores the information describing the user's interactions with the content provided by the third party system 130 in association with the user in the action log 220. For example, the third party system 130 includes instructions in content that, when executed by a client device 110 presenting the content, identify the content, identify additional content presented to the user prior to the content, and identify a user associated with the client device 110 to the online system 140, and generate a frame associated with the online system 140 within the content; the identified information is communicated from the client device 110 to the online system 140 via the frame associated with the online system 140. Based on the received information, the online system 140 identifies one or more interactions, as further described below in conjunction with FIG. 3, and stores the information describing the identified one or more interactions in association with the user in the action log 220. The information identifying the user to the online system received from the client device 140 may be obfuscated information maintained by the client device 110 that identifies the user (e.g., a hash of information stored on the client device 110 by the online system 140 that identifies the user to the online system 140), and the online system 140 retrieves information identifying the user from the information communicated to the online system 140. Hence, the action log 220 may record information about actions users perform on a third party system 130, including webpage viewing histories, interactions with advertisements, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In various embodiments, the online system 140 includes a rule store 230 that stores rules received from various third party systems 130. A rule received from a third party system 130 identifies at least one action for the online system 140 to perform if information received by the online system 140 from a client device 110 matches information included in the rule. Different rules received from the third party system 130 may identify different combinations of information identifying content from the third party system 130 presented by a client device 110, information identifying additional content presented by the client device 110, information describing the client device 110, and any other suitable information received from the client device 110. Different actions are identified by different rules included in the rule store 230. For example, certain rules in the rule store 230 cause the online system 140 to include a user corresponding to information identifying the user received from a client device 110 in a set of users. Hence, a rule identifies a set of users (e.g., includes a name or other identifier of the set) and information identifying content from the third party system 130 presented by a client device 110, information identifying additional content presented by the client device 110, information describing the client device 110, and any other suitable information received from the client device 110.

As another example, rules in the rule store 230 cause the online system 140 to associate a conversion event with the user corresponding to the information identifying the user received from the client device 110. A conversion event is an action identified by the third party system 130 for association with online system users. Example conversion events include: adding a product to an online shopping cart maintained by the third party system 130, viewing content (e.g., a web page, a product, etc.), provided by the third party system 130, viewing content provided by the third party system 130 for at least a specified amount of time (e.g., viewing video data provided by the third party system for at least the specified amount of time), adding a product to a list of products associated with the user by the third party system 130, requesting information from the third party system 130, subscribing to a service provided by the third party system 130, storing content to the third party system, storing content provided by the third party system 130 to the client device 110, indicating a preference for content provided by the third party system 130, sharing content provided by the third party system 130 with another user, and providing a comment associated with content provided by the third party system 130. Hence, a rule identifies a conversion event and information identifying content from the third party system 130 presented by a client device 110, information identifying additional content presented by the client device 110, information describing the client device 110, and any other suitable information received from the client device 110.

The association module 235 compares information received from a client device 110 with rule stored in the rule store 230 to select a rule including information matching the information received from the client device 110. For example, the association module 235 selects a rule from the rule store 230 that includes information identifying content from the third party system 130 presented by the client device and information identifying additional content presented by the client device 110, matching information received from the client device 110 identifying content presented from the third party system 130 by the client device and identifying additional content presented by the third party system 130. Different rules may identify different combinations of information, so the association module 235 may select multiple rules based on information received from the client device 110. For example, a rule includes one or more logical operators (e.g., AND, OR, XOR, etc.) identifying relationships between information identifying content provided by the third party system 130 and presented by the client device 110, information identifying additional content presented by the client device 110, information describing the client device 110, or other information (e.g., a date and time when the content provided by the third party system 130 was presented, information describing interactions by the user with one or more other applications executing on the client device 110, etc.), allowing the third party system 130 to identify a variety of actions for the online system 140 to perform based on information received from a client device 110. For example, the association module selects a rule specifying information identifying specific content provided by the third party system 130 presented by a client device 110 in combination with information identifying specific additional content presented by the client device 110 and also selects a rule specifying a specific operating system executing on the client device 110 presenting the content in combination with the information identifying the specific content provided by the third party system 130. As further described below in conjunction with FIG. 3, the association module 235 performs an action identified by the selected rule. For example, the association module 235 identifies a user corresponding to information identifying the user to the online system 140 received from the client device 110 and stores information associating the user with a set of users identified by the selected rule or stores a conversion event identified by the selected rule in association with the user corresponding to the information identifying the user to the online system 140 received from the client device 110.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, analyzed information, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS®, or BlackberryOS.

Figure 3:
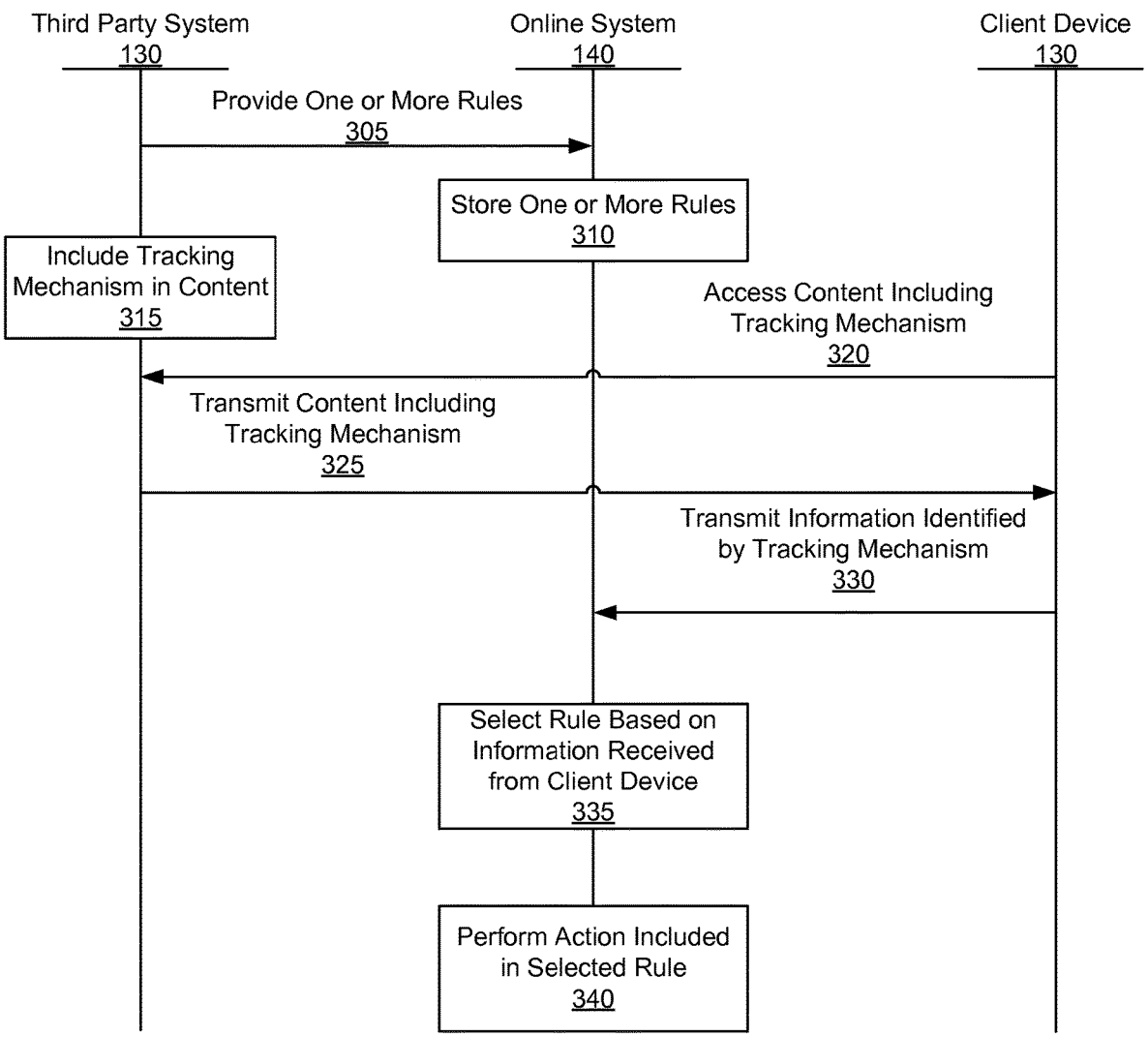
FIG. 3 is an interaction diagram of a method for maintaining information describing interactions by online system users with content provided by a third party system, in accordance with an embodiment.

Storing Interactions by Online System Users with Content Presented by Third Party Systems FIG. 3 is an interaction diagram of one embodiment of a method for maintaining information describing interactions by online system users with content provided by a third party system 130. In other embodiments, the method may include different and/or additional steps than those shown in FIG. 3. Additionally, steps of the method may be performed in different orders than the order described in conjunction with FIG. 3 in various embodiments.

The third party system 130 provides 305 one or more rules to an online system 140, which stores 310 the rules. A rule provided 305 by the third party system 130 identifies one or more criteria and an action for the online system 140 to perform if at least a threshold number of the criteria are satisfied. In various embodiments, rules identify information provided by the third party system 130 and presented to an online system user as criteria. Additionally, a rule may include criteria specifying information identifying additional content presented to the online user by a client device 110, information describing a client device 110 that presented the information provided by the third party system 130 (e.g., an operating system executing on the client device 110, a type of the client device 110, an application executing on the client device 110 and that presented content provided by the third party system 130, etc.). Other information may be identified by a rule as criteria, such as a date and time when content provided by the third party system 130 was presented by a client device 110 or specific interactions with one or more applications executing on a client device 110. As described above in conjunction with FIG. 2, a rule may include any suitable logical operators identifying relationships between criteria to identify when the criteria are satisfied. Different rules received from the third party system 130 may identify different combinations of information identifying content from the third party system 130 presented by a client device 110, information identifying additional content presented by the client device 110, information describing the client device 110, and any other suitable information received from the client device 110.

Different actions are identified by different rules provided 305 by the third party system 130 and stored 310 by the online system 140. For example, a rule identifies an action of including a user in a set of users identified by the rule when at least the threshold number of criteria included in the rule are satisfied. As a specific example, a rule identifies a set of users (e.g., includes a name or other identifier of the set) and information identifying content provided by the third party system 130 presented by a client device 110, information identifying additional content presented by the client device 110, information describing the client device 110, and any other suitable information received from the client device 110. As another example, a rule causes the online system 140 to associate a conversion event with a user when at least the threshold number of criteria included in the rule are satisfied. A conversion event is an action identified by the third party system 130 for association with online system users. Example conversion events include: adding a product to an online shopping cart maintained by the third party system 130, viewing content (e.g., a web page, a product, etc.), provided by the third party system 130, viewing content provided by the third party system 130 for at least a specified amount of time (e.g., viewing video data provided by the third party system for at least the specified amount of time), adding a product to a list of products associated with the user by the third party system 130, requesting information from the third party system 130, subscribing to a service provided by the third party system 130, storing content to the third party system, storing content provided by the third party system 130 to the client device 110, indicating a preference for content provided by the third party system 130, sharing content provided by the third party system 130 with another user, and providing a comment associated with content provided by the third party system 130.

The third party system 130 also includes 315 a tracking mechanism in various content provided by the third party system 130. In various embodiments, the third party system 130 includes 315 a common tracking mechanism in various content provided by the third party system 130. For example, the third party system 130 includes 315 a common tracking pixel in multiple web pages provided by the third party system 130. The tracking mechanism is instructions included in content provided by the third party system 130 that, when executed by a client device 110 presenting the content, communicates a request for content from the client device 110 to the online system 140 that includes information identifying the user to the online system 140 retrieved from the client device 110 and includes information describing the content from the third party system 130 presented by the client device 110. In some embodiments, execution of the tracking mechanism causes the client device 110 to communicate additional information to the online system 140 in the request, such as information identifying content from the third party system 130 or from another entity that the client device 110 presented to the user prior to presenting the content including the tracking mechanism, information describing the client device 110 (e.g., such as an operating system executing on the client device 110, a model or a type of the client device 110, a type of network connection by the client device 110), a time when the client device 110 executed the tracking mechanism, a date and time when the client device 110 presented the content from the third party system 130, or other suitable information. Hence, a tracking mechanism included 315 in content provided by a third party system 130 may communicate any suitable information to the online system 140 when executed by the client device 110 that presents the content.

A user of the online system 140 accesses 320 content provided by the third party system 130 that includes 315 the tracking mechanism via a client device 110. The third party system 130 transmits 325 the content, including the tracking mechanism, to the client device 110 via a network 120 for presentation to the user. When the client device 110 presents the content from the third party system 130, the client device 110 executes the instructions within the content comprising the tracking mechanism that transmit 330 information identifying the content provided by the third party system 130 and information identifying the user associated with the client device 110 to the online system 140. For example, executing the instructions comprising the tracking mechanism cause the client device 110 to retrieve information stored on the client device 110 by the online system 140 identifying the user (e.g., a cookie stored in a browser or other application executing on the client device 110 by the online system 140) and to transmit 330 the information identifying the user to the online system 140 as well as information identifying the content provided by the third party system 130 to the online system 140. In various embodiments, executing the instructions comprising the tracking mechanism included in the content provided by the third party system 130 also causes the client device 110 to transmit 330 information identifying additional content presented by the client device 110 (e.g., content presented by the client device 110 prior to presentation of the content provided by the third party system 130 including the tracking mechanism, information describing the client device 110 (e.g., an operating system executing on the client device 110, a type of the client device 110, an application executing on the client device 110 that presents the content provided by the third party system 130, etc.), a date and time when the client device 110 presented the content provided by the third party system 130, or other suitable information.

Based on the information received from the client device 110 that executed the instructions comprising the tracking mechanism, the online system 140 selects 335 a rule received from the third party system 130 and stored by the online system 140. The online system 140 selects 335 one or more rules having at least a threshold number of criteria satisfied by the information received from the client device 110. For example, the online system 140 selects 335 a rule including information identifying content provided by the third party system 130 matching information identifying content provided by the third party system 130 that was received from the client device 110. As another example, the online system 140 selects 335 a rule including information identifying content provided by the third party system 130 matching information identifying content provided by the third party system 130 that was received from the client device 110 and also including additional criteria satisfied by information received from the client device 110 (e.g., including information identifying additional content presented that matching information identifying additional content presented by the client device 110 included in the information received from the client device 110). In a specific example, the online system 140 selects 335 a rule including information identifying content provided by the third party system 130 matching information identifying content provided by the third party system 130 that was received from the client device 110 and also including information identifying an application presenting the content provided by the third party system 130 on the client device 110 and identifying a type of client device 110 matching information identifying an application presenting the content and a type received from the client device 110. As described above, rules from the third party system 130 may specify different combinations of criteria through various logical operators to regulate selection of rules based on information received from the client device 110.

In some embodiments, the online system 140 uses additional information stored by the online system 140 or received from the client device 110 to select 335 a rule from the third party system 130. For example, one or more rules identify interactions with additional applications executing on the client device 110, so the online system 140 accounts for additional information received from the client device 110 identifying interactions with additional applications executing on the client device 110 when selecting 335 one or more rules. Similarly, the online system 140 may access stored information associated with a user corresponding to the information identifying the user to the online system 140 received from the client device 110 to determine if the stored information satisfies one or more criteria specified by a rule. For example, the online system 140 compares demographic information associated with the user identified by information received from the client device 110 to demographic information included in a rule to determine if one or more criteria included in the rule are satisfied. The online system 140 may regulate access to information it associates with a user based on one or more privacy settings specified by the user to maintain the user's privacy.

The online system 140 subsequently performs 340 an action included in the selected rule. For example, the selected rule includes an action that associates a user with a set of users identified by the third party system 130 in the rule, so the online system 140 stores information associating the user corresponding to the information identifying the user to the online system 140 included in the information received from the client device 110 satisfying at least the threshold number of criteria included in the selected rule with the set of users identified in the selected rule to perform 340 the action included in the selected rule. In some embodiments, the online system 140 associates information identifying the user with information identifying the set of users included in the selected rule. Alternatively or additionally, the online system 140 associates information identifying the set of users included in the selected rule with information identifying the user.

As another example, the selected rule associates a conversion event with the user corresponding to information identifying the user to the online system 140 included in information received from the client device 110 satisfying at least the threshold number of criteria included in the selected rule. A conversion event is an action identified by the third party system 130 for association with one or more users of the online system 140. Example conversion events include: adding a product to an online shopping cart maintained by the third party system 130, viewing content (e.g., a web page, a product, etc.) provided by the third party system 130, viewing content provided by the third party system 130 for at least a specified amount of time (e.g., viewing video data provided by the third party system 130 for at least the specified amount of time), adding a product to a list of products associated with the user by the third party system 130, requesting information from the third party system 130, subscribing to a service provided by the third party system 130, storing content to the third party system 130, storing content provided by the third party system 130 to the client device 110, indicating a preference for content provided by the third party system 130, sharing content provided by the third party system 130 with another user, and providing a comment associated with content provided by the third party system 130. To perform 340 the action included in the selected rule, the online system 140 stores a conversion event identified by the selected rule in association with information used by the online system 140 to identify the user received from the client device 110 with the information satisfying at least the threshold number of criteria included in the selected rule.

Associating rules with various information received from a tracking mechanism allows the third party system 130 to identify different actions for the online system 140, while allowing the third party system 130 to include a common tracking mechanism in various content provided by the third party system 130. Applying rules to information received from the tracking mechanism allows the third party system 130 to identify a variety of actions for the online system 140 to perform based on information the online system 140 receives from the tracking mechanism when a client device executes the tracking mechanism. Hence, the third party system 130 may more efficiently provide information to an online system 140 to maintain information describing interactions by online system users with content provided by the third party system 130 while reducing the number of tracking mechanisms maintained by the third party system 130.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving, by an online system, one or more rules, each rule identifying an action performed by a user of the online system on a webpage from a third party system, the webpage from the third party system including a tracking mechanism and presented to the user on a client device, a rule identifying the action performed by the user of the online system on the webpage from the third party system corresponding to a combination of: an identifier of the webpage from the third party system including the tracking mechanism and presented to the user of the online system by the client device, information identifying content presented to the user of the online system by the client device prior to presenting the webpage from the third party system including the tracking mechanism, and one or more characteristics of the client device the rule also comprising content to render the tracking mechanism in the webpage from the third party system;

receiving, by the online system, a request for content to render the tracking mechanism included in the webpage from the third party system, the request received from the client device presenting the webpage from the third party system to the user of the online system by the client device;

retrieving, by the online system, from the request for content, the identifier of the webpage from the third party system including the tracking mechanism and presented to the user of the online system by the client device, an identifier of the user of the online system, information identifying content presented to the user of the online system by the client device prior to presenting the webpage from the third party system including the tracking mechanism, and one or more characteristics of the client device;

selecting, by the online system, a rule from the one or more rules that includes the identifier of the webpage from the third party system including the tracking mechanism and presented to the user of the online system by the client device, the information identifying content presented to the user of the online system by the client device prior to presenting the webpage from the third party system including the tracking mechanism retrieved from the request, and one or more characteristics of the client device retrieved from the request, the selected rule comprising content to render the tracking mechanism in the webpage from the third party system; and storing, by the online system, based on the selected rule, an association between the identifier of the user of the online system and the action performed by the user of the online system on the webpage from the third party system including the tracking mechanism and presented to the user of the online system by the client device identified by the selected rule.

2. The method of claim 1, further comprising:
associating the identifier of the user of the online system with a set of users of the online system based on the selected rule.

3. The method of claim 1, wherein storing, by the online system, based on the selected rule, an association between the identifier of the user of the online system and the action performed by the user of the online system comprises:
identifying a conversion event matching the action performed by the user of the online system on the webpage from the third party system including the tracking mechanism and presented to the user of the online system by the client device identified by the selected rule; and
storing an association between the identifier of the user of the online system and the conversion event.

4. The method of claim 3, wherein the conversion event is selected from a group consisting of: adding a product to an online shopping cart maintained by the third party system, viewing the webpage presented to the user, viewing the webpage presented to the user for at least a specified amount of time, adding the product to a list of products associated with the user by the third party system, requesting information from the third party system, subscribing to a service provided by the third party system, storing content to the third party system, storing content provided by the third party system to the client device, and any combination thereof.

5. The method of claim 3, wherein the conversion event is selected from a group consisting of: indicating a preference for the webpage presented to the user, sharing the webpage presented to the user with another user, providing a comment associated with the webpage presented to the user, and any combination thereof.

6. The method of claim 1, wherein selecting, by the online system, the rule from the one or more rules that includes the identifier of the webpage from the third party system including the tracking mechanism and presented to the user of the online system by the client device, the information identifying content presented to the user of the online system by the client device prior to presenting the webpage from the third party system including the tracking mechanism retrieved from the request, and one or more characteristics of the client device retrieved from the request, the selected rule comprising content to render the tracking mechanism in the webpage from the third party system comprises:
selecting a rule including an identifier of a webpage presented to the user of the online system matching the received identifier of the webpage from the third party system including the tracking mechanism and presented to the user of the online system by the client device.

7. The method of claim 1, wherein selecting, by the online system, the rule from the one or more rules that includes the identifier of the webpage from the third party system including the tracking mechanism and presented to the user of the online system by the client device, the information identifying content presented to the user of the online system by the client device prior to presenting the webpage from the third party system including the tracking mechanism retrieved from the request, and one or more characteristics of the client device retrieved from the request, the selected rule comprising content to render the tracking mechanism in the webpage from the third party system comprises:
selecting a rule including an identifier of a webpage presented to the user of the online system matching the received identifier of the webpage from the third party system including the tracking mechanism and presented to the user of the online system by the client device, including the information identifying content presented to the user of the online system by the client device prior to presenting the webpage from the third party system including the tracking mechanism retrieved from the request, and including information describing one or more client devices matching the received information identifying a type of the client device received from the request.

8. The method of claim 1, wherein the one or more characteristics of the client device retrieved from the request are selected from a group consisting of: an operating system executing on the client device, a type of the client device, a model of the client device, a type of network connection by the client device, an application executing on the client device that presented the webpage from the third party system, and any combination thereof.

9. The method of claim 1, wherein the online system further retrieves, from the request for content, a date and a time when the client device presented the webpage from the third party system, and wherein one or more of the rules includes dates and times.

10. The method of claim 9, wherein selecting, by the online system, the rule from the one or more rules that includes the identifier of the webpage from the third party system including the tracking mechanism and presented to the user of the online system by the client device, the information identifying content presented to the user of the online system by the client device prior to presenting the webpage from the third party system including the tracking mechanism retrieved from the request, and one or more characteristics of the client device retrieved from the request, the selected rule comprising content to render the tracking mechanism in the webpage from the third party system comprises:
selecting a rule including an identifier of a webpage presented to the user of the online system matching the received identifier of the webpage from the third party system including the tracking mechanism and presented to the user of the online system by the client device, including the information identifying content presented to the user of the online system by the client device prior to presenting the webpage from the third party system including the tracking mechanism retrieved from the request, including one or more characteristics of the client device retrieved from the request and including a date and a time matching the received date and time when the client device presented the webpage from the third party system.

11. A computer program product comprising a computer readable storage medium having instructions encoded thereon that, when executed by a processor, cause the processor to:
receive, by an online system, one or more rules, each rule identifying an action performed by a user of the online system on a webpage from a third party system, the webpage from the third party system including a tracking mechanism and presented to the user on a client device, a rule identifying the action performed by the user of the online system on the webpage from the third party system corresponding to a combination of: an identifier of the webpage from the third party system including the tracking mechanism and presented to the user of the online system by the client device, information identifying content presented to the user of the online system by the client device prior to presenting the webpage from the third party system including the tracking mechanism, and one or more characteristics of the client device the rule also comprising content to render the tracking mechanism in the webpage from the third party system;

receive, by the online system, a request for content to render the tracking mechanism included in the webpage from the third party system, the request received from the client device presenting the webpage from the third party system to the user of the online system by the client device;

retrieve, by the online system, from the request for content, the identifier of the webpage from the third party system including the tracking mechanism and presented to the user of the online system by the client device, an identifier of the user of the online system, information identifying content presented to the user of the online system by the client device prior to presenting the webpage from the third party system including the tracking mechanism, and one or more characteristics of the client device;

select, by the online system, a rule from the one or more rules that includes the identifier of the webpage from the third party system including the tracking mechanism and presented to the user of the online system by the client device, the information identifying content presented to the user of the online system by the client device prior to presenting the webpage from the third party system including the tracking mechanism retrieved from the request, and one or more characteristics of the client device retrieved from the request, the selected rule comprising content to render the tracking mechanism in the webpage from the third party system; and store, by the online system, based on the selected rule, an association between the identifier of the user of the online system and the action performed by the user of the online system on the webpage from the third party system including the tracking mechanism and presented to the user of the online system by the client device identified by the selected rule.

* * * * *